(12) United States Patent
Ormesher et al.

(10) Patent No.: US 7,864,097 B1
(45) Date of Patent: Jan. 4, 2011

(54) RADAR TRANSPONDER OPERATION WITH COMPENSATION FOR DISTORTION DUE TO AMPLITUDE MODULATION

(75) Inventors: Richard C. Ormesher, Albuquerque, NM (US); Bertice L. Tise, Albuquerque, NM (US); Robert M. Axline, Jr., Albuquerque, NM (US)

(73) Assignee: Sandia Corporation, Albuquerque, NM (US)

( * ) Notice: Subject to any disclaimer, the term of this patent is extended or adjusted under 35 U.S.C. 154(b) by 79 days.

(21) Appl. No.: 12/349,137

(22) Filed: Jan. 6, 2009

(51) Int. Cl.
*G01S 13/08* (2006.01)
(52) U.S. Cl. .......................... 342/51; 342/42
(58) Field of Classification Search ............ 342/51
See application file for complete search history.

(56) References Cited

U.S. PATENT DOCUMENTS

| 2,671,895 | A | * | 3/1954 | Perkins .................. 342/46 |
| 3,900,869 | A | * | 8/1975 | Jensen ................... 342/106 |
| 5,486,830 | A | | 1/1996 | Axline et al. |
| 5,519,400 | A | * | 5/1996 | McEwan .................. 342/28 |
| 6,055,287 | A | * | 4/2000 | McEwan .................. 375/376 |
| 6,456,231 | B1 | * | 9/2002 | McEwan .................. 342/93 |
| 6,812,824 | B1 | * | 11/2004 | Goldinger et al. ......... 340/10.1 |

* cited by examiner

*Primary Examiner*—Thomas H Tarcza
*Assistant Examiner*—Timothy A Brainard
(74) *Attorney, Agent, or Firm*—Elmer A. Klavetter

(57) ABSTRACT

In radar transponder operation, a variably delayed gating signal is used to gate a received radar pulse and thereby produce a corresponding gated radar pulse for transmission back to the source of the received radar pulse. This compensates for signal distortion due to amplitude modulation on the retransmitted pulse.

15 Claims, 3 Drawing Sheets

US 7,864,097 B1

RADAR TRANSPONDER OPERATION WITH COMPENSATION FOR DISTORTION DUE TO AMPLITUDE MODULATION

This invention was developed under Contract DE-AC04-94AL85000 between Sandia Corporation and the U.S. Department of Energy. The U.S. Government has certain rights in this invention.

FIELD OF THE INVENTION

The invention relates generally to radar and, more particularly, to radar transponder operation.

BACKGROUND OF THE INVENTION

U.S. Pat. No. 5,486,830 (incorporated by reference herein) describes a system wherein a synthetic aperture radar (SAR) apparatus carried on an airborne platform transmits a set of pulses for reception at a coherent gain-block tag. The tag processes each received pulse, first by amplitude-modulating the pulse (denoted as "chopping"), and then by applying bi-phase modulation. The tag then transmits the result (i.e., the processed pulse) to the SAR apparatus. The tag thus functions as a transponder apparatus. The processed pulse that is transmitted by the tag is also referred to as a retransmitted pulse or tag response.

The SAR apparatus collects a series of the retransmitted pulses and performs coherent SAR-tag processing. A tag image is produced that can be used to provide relative location of the tag within a normal SAR image. The SAR apparatus also forms its normal SAR context image using reflections of the same set of radar pulses received by the tag. In addition, the radar can process the retransmitted pulses to extract data from the tag.

In the system of U.S. Pat. No. 5,486,830, the amplitude modulation applied by the tag causes a significant distortion in the retransmitted pulses. This distortion manifests itself as unwanted side lobes that appear when the SAR apparatus applies range-compression to the retransmitted pulses. The first harmonic of these side lobes contains half the energy of the desired, range-compressed signal. When several tags are being illuminated by the SAR apparatus, it becomes difficult to distinguish the unwanted side lobes associated with any given tag from the main lobes (primary response lobes) of other tags. This effect makes it difficult for the SAR apparatus simultaneously to process several tags within a common set of radar pulses.

It is desirable in view of the foregoing to provide for reduction of distortion in the retransmitted pulses produced by transponders in systems of the type described above. Exemplary embodiments of the present invention reduce distortion in retransmitted pulses by applying a random delay to a chopping signal used for modulation in the transponder. This permits the SAR apparatus to process simultaneously many transponders within a common area of illumination.

DETAILED DESCRIPTION

Figure 1:
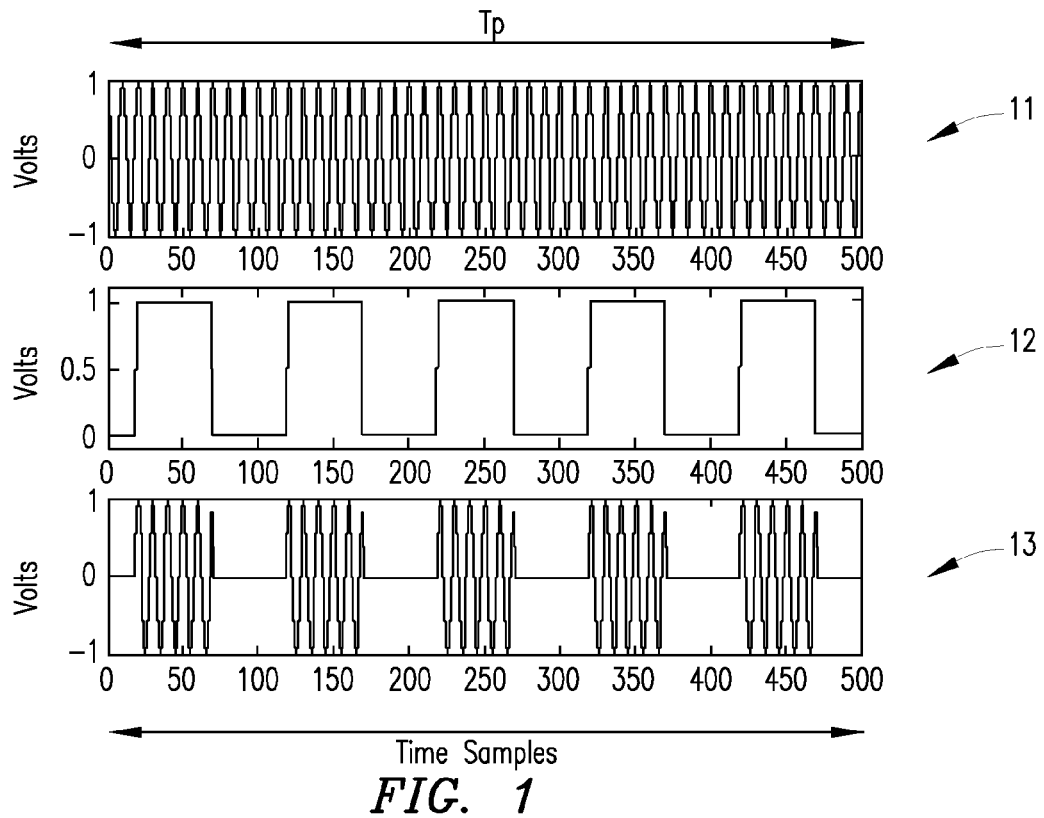
FIG. 1 is a timing diagram of selected prior art signals.

FIG. 1 shows at 11 a deramped radar pulse that the tag receives from the SAR apparatus in U.S. Pat. No. 5,486,830 (before chopping is applied). The chopping signal of U.S. Pat. No. 5,486,830 (provided by logic 28 to gate 23 in FIG. 2 of U.S. Pat. No. 5,486,830) is shown at 12 in FIG. 1. Note that the rising edge of the first pulse of the chopping signal 12 is not synchronized with the beginning of the received SAR pulse 11. This is because the tag's internal clock is not time-synchronized with the received SAR pulse 11. The deramped, amplitude-modulated (i.e., with chopping) pulse is shown at 13 in FIG. 1. This pulse 13 corresponds to the output of gate 23 in U.S. Pat. No. 5,486,830.

The tag return signal received at the SAR apparatus of U.S. Pat. No. 5,486,830 is given as follows (after deramping and phase stabilization):

$$v_r(t) = p(t-\Theta)\exp\{j(2\pi f_r t + \phi(t_s))\} \quad (1)$$

where p(t) is the chopping signal (i.e., amplitude modulation) that is applied by the tag, $\Theta$ is a time delay due to the phase difference between the SAR apparatus clock and the tag's internal clock, $f_r$ is the residual carrier frequency that is dependent on the tag's range offset with respect to the Scene Reference Point (SRP), $\phi(t_s)$ contains the Doppler frequency term that is dependent on the tag's azimuth position with respect to the Scene Reference Point (SRP), and $t_s$ is slow time. In equation (1), t is defined for the time that the signal is available at the receiver of the SAR apparatus.

Range compression is the first step for the SAR apparatus of U.S. Pat. No. 5,486,830 when processing the tag return signal of equation (1). Assuming that no focusing is required in range or azimuth, then range compression can be performed by applying the Fourier Transform (FT) to the received signal as follows $$FT\{v_r(t)\} = V_r(f) = FT\{p(t-\Theta)\} \otimes FT\{\exp\{j(2\pi f_r t + \phi(t_s))\}\} \quad (2)$$

Figure 2:
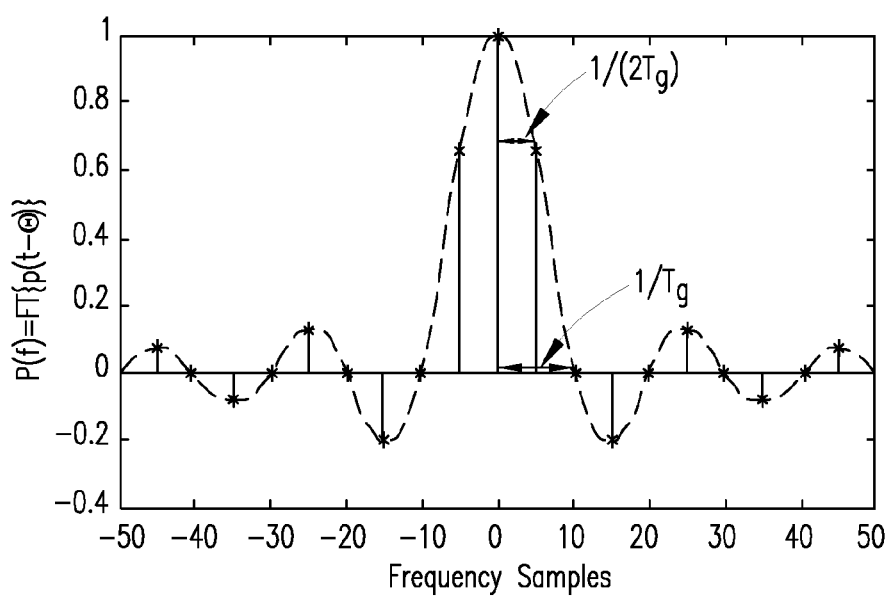
FIG. 2 is a frequency versus magnitude plot of a prior art signal.

The transform of the first term in equation (2) can be written as $$FT\{p(t-\Theta)\} = \quad (3)$$
$$P(f) = T_g \frac{\sin(\pi f T_g)}{\pi f T_g} \text{comb}\left(f; \frac{1}{2T_g}\right)\exp(-j2\pi f\Theta)$$

where $2T_g$ is the period of the chopping pulse, p(t). P(f) is a sampled sinc function multiplied by a complex exponential with an unknown phase term, $-2\pi f\Theta$. The phase term is due to the unknown clock error between the SAR apparatus and the tag. FIG. 2 is a normalized magnitude plot of equation (3).

The transform of the second term in equation (2) can be approximated as follows $$FT\{\exp\{j(2\pi f_r t + \phi(t_s))\}\} \approx \delta(f_r)\exp\{j\phi(t_s)\} \quad (4)$$

where $\phi(t_s)$ is assumed constant over a single radar pulse. For simplicity, the range sinc function has been replaced with the ideal delta function, and the signal amplitude has been ignored.

Combining equations (3) and (4), the range-compressed signal can be written as $$x(f, t_s) = \left[ T_g \frac{\sin(\pi f T_g)}{\pi f T_g} \text{comb}\left(f; \frac{1}{2T_g}\right) \exp(-j2\pi f \Theta) \right] \otimes [\exp\{j\varphi(t_s)\}\delta(f_r)] \quad (5)$$

$$x(f, t_s) = T_g \frac{\sin(\pi(f - f_r)T_g)}{\pi(f - f_r)T_g} \text{comb}\left(f - f_r; \frac{1}{2T_g}\right) \quad (6)$$
$$\exp(-j2\pi(f - f_r)\Theta)\exp(j\varphi(t_s))$$

Several observations can be made by examining equation (6). First, it does not represent the typical impulse response (IPR) of a point target. Instead, it is a sampled sinc function having a main lobe positioned where the normal point return would be expected, and having many other side-lobes separated by an amount proportional to the frequency of the chopping signal. Second, because of the convolution operation, each side-lobe is multiplied by the two phase terms of equation (6). The first phase term, $\varphi(t_s)$, allows the SAR apparatus to apply conventional azimuth compression with respect to the tag response. The second phase term, $2\pi(f-f_r)\Theta$, is a constant phase that is zero for the main lobe where $f=f_r$. Also, note that in equation (5), the phase term $\varphi(t_s)$ is assumed to be constant over the extent of a single radar pulse, but to vary slowly from pulse to pulse. Finally, FIG. 2 shows that the first side-lobe is down only 3 dB with respect to the main lobe response.

In conventional azimuth compression processing of the received tag response, the SAR apparatus applies an azimuth Fourier Transform with respect to slow time, $t_s$, as follows $$FT\{x(f, t_s)\} = FT\left\{T_g \frac{\sin(\pi(f - f_r)T_g)}{\pi(f - f_r)T_g} \right. \quad (7)$$
$$\left. \text{comb}\left(f - f_r; \frac{1}{2T_g}\right)\exp(-j2\pi(f - f_r)\Theta)\exp(j\varphi(t_s))\right\}$$

$$X(f, f_{az}) = T_g \frac{\sin(\pi(f - f_r)T_g)}{\pi(f - f_r)T_g} \quad (8)$$
$$\text{comb}\left(f - f_r; \frac{1}{2T_g}\right) FT\{\exp(-j2\pi(f - f_r)\Theta)\exp(j\varphi(t_s))\}$$

In equation (8), the Fourier Transform is with respect to the slow time variable, $t_s$. The main lobe response is defined as occurring at $f=f_r$, and is given as $$X(f_r, f_{az}) = T_g FT\{\exp(j\varphi(t_s))\} \quad (9)$$

The range side-lobe can be expressed as $$X(f, f_{az}) = K \cdot FT\{\exp(j\varphi(t_s) - j2\pi(f - f_r)\Theta)\}, \quad (10)$$
$$f = f_r \pm \frac{n}{2T_g}, n = 1, 2, \ldots$$

where K is a constant whose value depends on the particular side-lobe. Notice that the phase term, $2\pi(f-f_r)\Theta$, in the expression above is just a constant with respect to the Fourier Transform. The magnitude response is given as $$|K| \cdot |FT\{\exp(j\varphi(t_s) - j2\pi(f-f_r)\Theta)\}| = |K| \cdot |FT\{\exp(j\varphi(t_s))\}| \quad (11)$$

Note that the constant phase term does not contribute to the magnitude response of a side-lobe. If it is the case that the phase term $2\pi(f-f_r)\Theta$ is a function of slow time, then the magnitude response of a side-lobe is given as $$|K| \cdot |FT\{\exp(j\varphi(t_s))\exp(-j2\pi(f-f_r)\Theta(t_s))\}| \quad (12)$$

Recall that the side-lobes are not desired, so the goal is to suppress or eliminate them in the SAR-tag image. The question arises, what form can $\Theta(t_s)$ take in order to reduce the magnitude response given by equation (10)? An obvious choice is to set $2\pi(f-f_r)\Theta(t_s)=\varphi(t_s)$. However, to do this one must know $\varphi(t_s)$, which depends on the unknown azimuthal position of the tag. Another approach is to make $\Theta(t_s)$ a time-varying nonlinear function. Here, the goal is to use the integration operation of the Fourier Transform to spread the side-lobe energy over the azimuth dimension. Recall that $\Theta$ is due to the clock error or difference between the SAR and tag clocks. In particular, $\Theta$ is due to the difference between the first rising edge of the chopping signal 12 and the beginning of the incoming SAR pulse 11 (see FIG. 1). Therefore, the phase term $2\pi(f-f_r)\Theta$ can be controlled by controlling the starting time (i.e., the time of the first rising edge) of the chopping signal 12.

Figure 3:
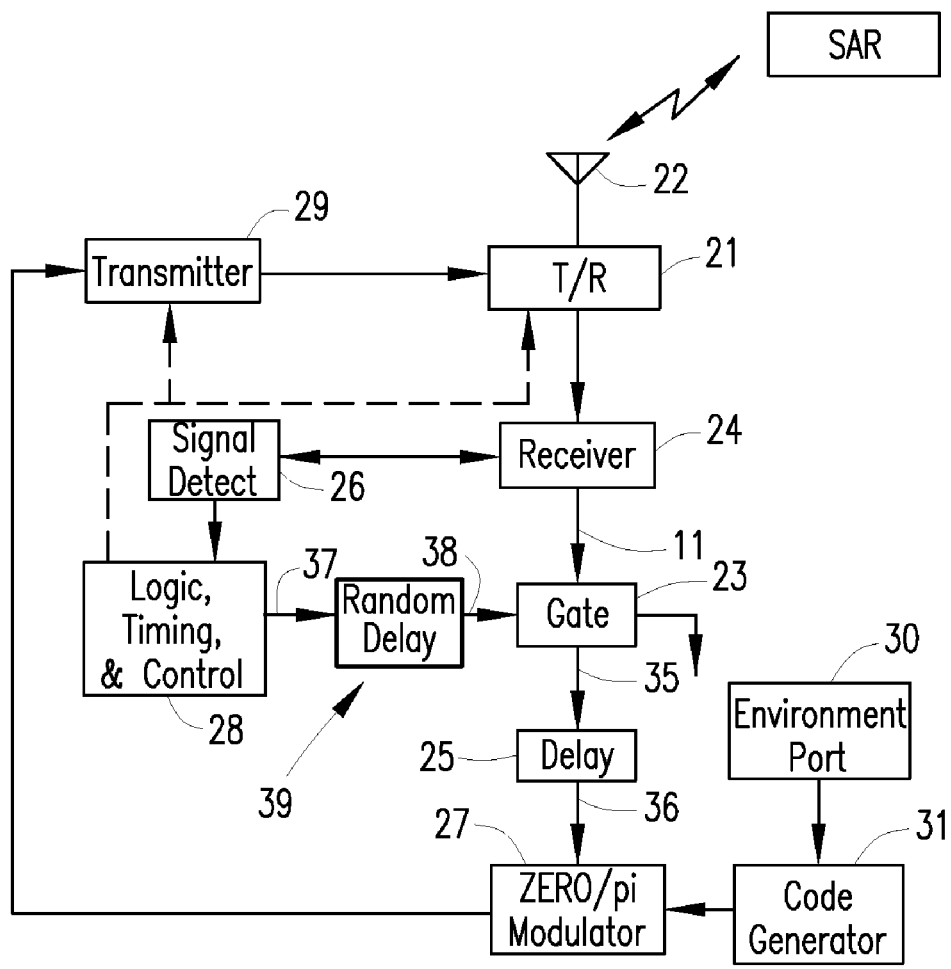
FIG. 3 diagrammatically illustrates a SAR and tag system according to exemplary embodiments of the invention.
Figure 4:
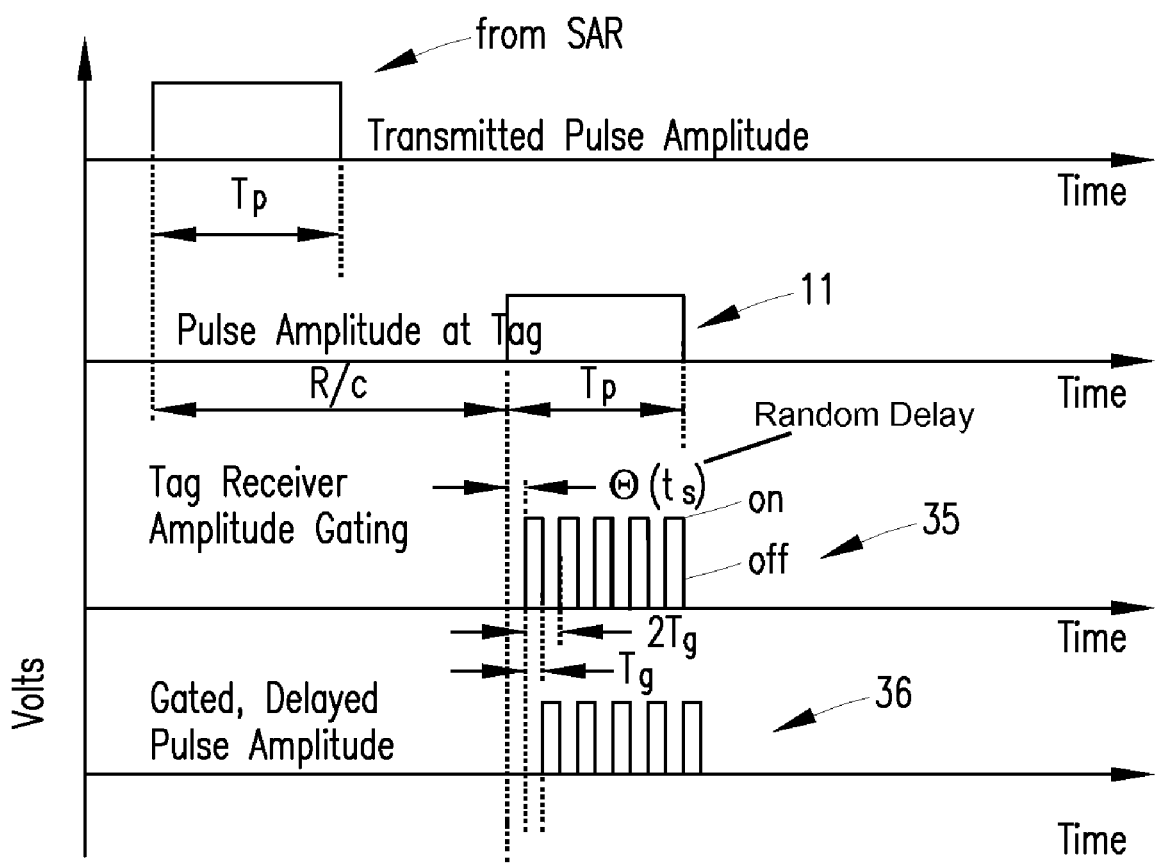
FIG. 4 is a timing diagram of selected signals associated with the tag of FIG. 3.

FIG. 3 diagrammatically illustrates a tag generally similar to that of U.S. Pat. No. 5,486,830, but suitably modified to introduce a time-varying, nonlinear characteristic to the phase term $2\pi(f-f_r)\Theta(t_s)$ according to exemplary embodiments of the invention. The chopping signal (also referred to herein as the gating signal) 37 from logic 28 is fed to a random time delay block 39, which adds a random time delay to the signal 37, such that a resulting delayed gating signal 38 is applied to the gate block 23. The gate block 23 produces a gated pulse 35 in response to the received SAR pulse 11 and the delayed gating signal 38. The timing diagram of FIG. 4 shows the gated pulse 35 and a corresponding delayed gated pulse 36 (produced in FIG. 3 by delay block 25).

The time delay $\Theta(t_s)$ is chosen, randomly, between each received SAR pulse, such that $2\pi(f-f_r)\Theta(t_s)$ is, in equation (10), a uniformly distributed random phase between $\pm\pi$. The random phase term is then integrated, via the Fourier Transform operation performed by the SAR apparatus. This technique reduces the overall magnitude of the side-lobe impulse response in FIG. 2. In order to obtain maximum side-lobe reduction, the time delay should be random over the entire slow-time processing interval of the tag. To achieve this goal, the time delay is defined in some embodiments as $$\Theta(t_s=n(2T_g)/N, 0 \leq n = N-1 \quad (13)$$

where N is the number of SAR pulses transmitted and received during the tag's slow-time processing interval, $2T_g$ is the period of the chopping clock in the transponder, and the index n is chosen from a uniform random distribution of integers. Thus, every pulse of the gating signal 37, at its particular position in slow time $t_s$, has applied thereto a randomly chosen time delay value. The equivalent random phase delay, evaluated at the frequency offset $f-f_r=1/(2T_g)$ (the first range sidelobe) is $$2\pi n(2T_g)/(2T_gN) = 2\pi n/N \quad (14)$$

Figure 5:
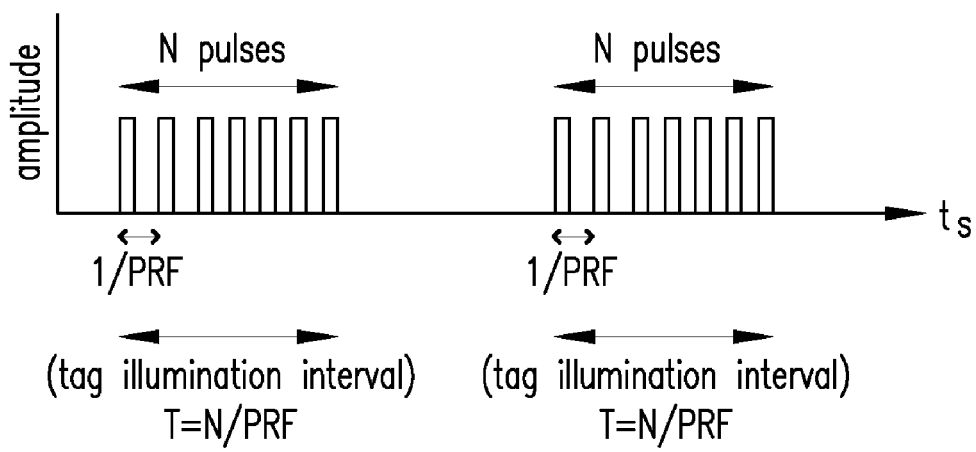
FIG. 5 is a timing diagram of a conventional SAR transmission signal that can be utilized by exemplary embodiments of the invention.

The random phase delay at the second sidelobe will be $6\pi n/N$, at the third sidelobe will be $10\pi n/N$, and so on. The number of pulses, N, in equations (13) and (14) is determined by the known length of time, T, that the SAR apparatus illuminates the tag (see FIG. 5), and the known PRF (pulse repetition frequency) of the SAR:

$$N = PRF \times T \quad (15)$$

Although some embodiments are described above in the context of use with airborne SAR platforms, it will be evident to workers in the art that the techniques of the invention are applicable to radar transponders in general, and are not limited to use with SAR or with airborne radar.

Although exemplary embodiments of the invention have been described above in detail, this does not limit the scope of the invention, which can be practiced in a variety of embodiments.

What is claimed is:

1. A radar transponder method, comprising:
   receiving a sequence of input radar pulses from a moving radar apparatus;
   providing a gating signal;
   delaying said gating signal by a delay amount that varies with time to produce a variably delayed gating signal;
   in response to said delayed gating signal and one of said input radar pulses, producing a gated pulse that corresponds to said one input radar pulse; and
   in response to said gated pulse, producing a corresponding output radar pulse.

2. The method of claim 1, wherein said delay amount varies nonlinearly with time.

3. The method of claim 2, including determining said delay amount based on a pulse repetition frequency associated with said sequence of input radar pulses.

4. The method of claim 3, including determining said delay amount based on a transmit frequency associated with said input radar pulses.

5. The method of claim 2, including determining said delay amount based on a transmit frequency associated with said input radar pulses.

6. The method of claim 2, wherein said delay amount varies randomly with time.

7. The method of claim 6, including determining said delay amount based on a pulse repetition frequency associated with said sequence of input radar pulses.

8. The method of claim 7, including determining said delay amount based on a transmit frequency associated with said input radar pulses.

9. The method of claim 8, including determining said delay amount based on a uniform random distribution.

10. The method of claim 7, including determining said delay amount based on a uniform random distribution.

11. The method of claim 6, including determining said delay amount based on a transmit frequency associated with said input radar pulses.

12. The method of claim 11, including determining said delay amount based on a uniform random distribution.

13. The method of claim 6, including determining said delay amount based on a uniform random distribution.

14. A radar transponder apparatus, comprising:
   an input for receiving a sequence of input radar pulses from a moving radar apparatus;
   a delay element for receiving a gating signal and delaying said gating signal by a delay amount that varies with time to produce a variably delayed gating signal;
   a gate coupled to said input and said delay element, said gate responsive to said delayed gating signal and one of said input radar pulses for producing a gated pulse that corresponds to said one input radar pulse; and
   a radar output portion coupled to said gate and responsive to said gated pulse for producing a corresponding output radar pulse.

15. A radar system, comprising:
   a mobile radar apparatus configured to transmit radar pulses; and
   a radar transponder apparatus, including
      an input for receiving from said mobile radar apparatus a sequence of input radar pulses transmitted by said mobile radar apparatus while said mobile radar apparatus is moving, a delay element for receiving a gating signal and delaying said gating signal by a delay amount that varies with time to produce a variably delayed gating signal, a gate coupled to said input and said delay element, said gate responsive to said delayed gating signal and one of said input radar pulses for producing a gated pulse that corresponds to said one input radar pulse, and a radar output portion coupled to said gate and responsive to said gated pulse for producing a corresponding output radar pulse.

* * * * *